United States Patent [19]

Kenney et al.

[11] 3,851,309

[45] Nov. 26, 1974

[54] CHARACTER RECOGNITION APPARATUS

[75] Inventors: Joseph R. Kenney, Woodbridge; Rolland Ernst Welch; William H. Reading, III, both of Fairfax, all of Va.; Alfred H. Carson, Melbourne, Fla.

[73] Assignee: Optical Recognition Systems, Reston, Va.

[22] Filed: Jan. 11, 1973

[21] Appl. No.: 322,809

[52] U.S. Cl. .................. 340/146.3 C, 340/146.3 Z, 340/347 SH

[51] Int. Cl. ............................................ G06k 9/18

[58] Field of Search...340/146.3 C, 146.3 Z, 347 H

[56] References Cited

UNITED STATES PATENTS 3,188,611 6/1965 Perotto ........................ 340/146.3 C

*Primary Examiner*—Thomas A. Robinson
*Attorney, Agent, or Firm*—Brown, Beveridge, DeGrandi & Kline

[57] ABSTRACT

A waveform recognition system which is especially applicable to character recognition systems wherein a unique analog waveform representative of each character is generated by a transducer. The waveform is normalized by a keyed AGC loop in the front end which controls the amplification of an amplifier in accordance with the magnitude of the first peak of the waveform. The magnitude of each peak of the waveform is converted to a coded digital signal and the coded digital signals representative of adjacent sequential peaks are compared in a digital comparator to determine whether each peak is greater than, equal to, or smaller than, the adjacent peak. The results of the comparisons define features which are processed by a logic recognition network to identify the character.

10 Claims, 3 Drawing Figures

CHARACTER RECOGNITION APPARATUS

This invention relates to an improved waveform recognition system and method in which signals representative of successive peaks of the waveform being recognized are compared to each other.

The waveform recognition system of the present invention is especially applicable to character recognition systems in which a transducer such as a magnetic or optical transducer generates a unique analog electrical waveform for each character scanned. One known character recognition system of the above type, manufactured by the assignee of the present application, recognizes the unique analog waveforms indicative of characters by comparing each peak of the waveform after the first peak with several analog reference levels generated from the previous peak. This recognition system, although superior to many prior art systems, has been found not to be accurate for certain specialized character recognition situations in which an extraordinarily high percentage of characters must be recognized, notwithstanding the fact that many of the characters may be non-ideal.

One disadvantage of the above-mentioned recognition system is that it is dependent upon distinguishing a large number of different magnitude levels of the waveform for recognition. The present invention recognizes that the magnitude information is the least reliable parameter of the analog waveform and therefore utilizes only three relative magnitude decisions, the system being arranged to determine only whether a digital signal representative of each peak is less than, greater than, or equal a digital signal representative of the previous peak. This digital comparison serves to eliminate the analog comparisons of waveform levels used by the prior art systems, along with the lack of accuracy associated therewith.

It is therefore an object of the invention to provide an improved waveform recognition system and method. It is a further object of the invention to provide a character recognition system utilizing only three relative magnitude decisions.

It is a further object of the invention to provide a waveform recognition system which compares a digital representation of the magnitude of each peak to a digital representation of the magnitude of each adjacent peak.

It is a further object of the invention to provide a character recognition system of improved dynamic range.

The above objects are accomplished by providing a character recognition system employing a keyed AGC system in the front end which normalizes the magnitude of each unique waveform in inverse correspondence with the magnitude of the first peak of the waveform. Each peak of the normalized waveform is captured by a follow and hold network and fed to an A to D converter which converts each peak magnitude to a coded digital signal. The coded digital signals are fed to a digital comparison network, the output of which indicates whether each peak is greater than, less than or equal to the adjacent peak. The outputs of the digital comparison network along with timing signals generated in correspondence with the occurrence of the peaks of the waveform are fed to recognition logic which determines the particular character which the waveform is indicative of.

The invention will be understood with greater clarity by referring to the drawings of a preferred embodiment of the invention in which.

Figures 1, 2:
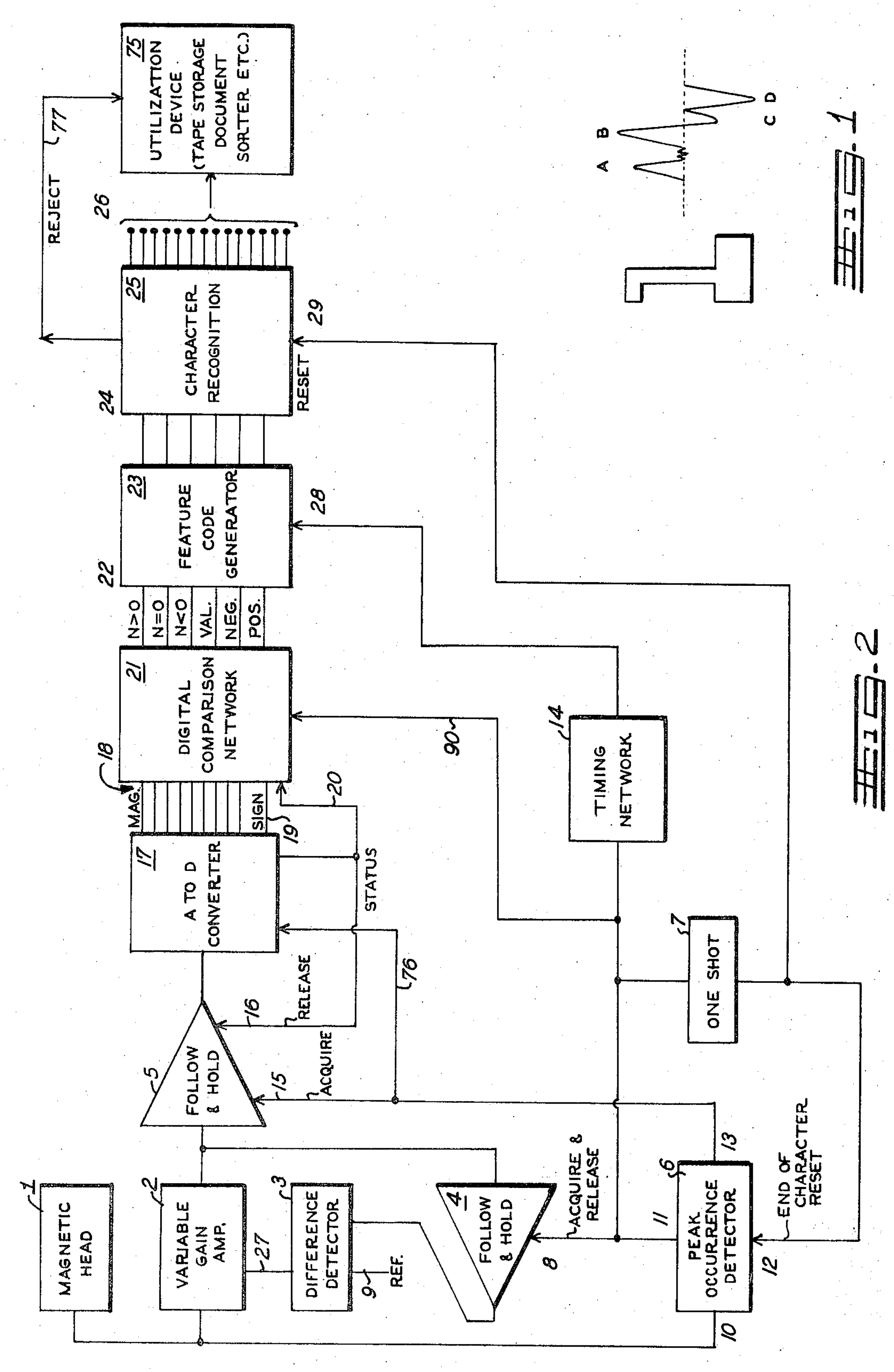
FIG. 1 represents an approximation of the numeral 1 in the E13B font along with a typical waveform generated by scanning this numeral.
FIG. 2 represents a block diagram of a magnetic character recognition system according to the invention.

FIG. 1 includes an approximate representation of the numeral 1 of the E13B character font. While the E13B font has been adopted by the American Bankers' Association for use with banking checks in this country, it is apparent that the recognition system of the invention can be used with any character font which results in a unique analog waveform when scanned by a transducer. When the numeral 1 shown in FIG. 1 is printed in magnetic ink, magnetized, and scanned with a single gap magnetic head which generates an electrical signal proportional to the time derivative of the flux passing through the gap, as known to those skilled in the art, a waveform such as shown in FIG. 1 results. Each character of the character font is designed so that it results in a unique analog waveform being generated when scanned by a single gap magnetic transducer.

Referring to FIG. 1, it is seen that the waveform includes positive peaks A and B and negative peaks C and D. The recognition scheme of the present invention works by generating a digitally coded signal representative of the magnitude of peak B and comparing the signal to a digitally coded signal representative of the magnitude of peak A. A digitally coded signal representative of peak C is then compared to a digitally coded signal representative of the magnitude of peak B and in a like fashion, a digital signal corresponding to peak D is compared to a digital signal corresponding to peak C. Each comparison determines whether the magnitude of each peak is greater than, less than, or equal to the magnitude of the adjacent peak and the information obtained from the comparisons is fed to recognition logic to determine which character the waveform is indicative of.

FIG. 2 shows a block diagram of a system according to the invention. A document having characters printed thereon in magnetic ink is fed past a magnetizing head (not shown) which magnetizes the magnetic ink of the characters. The document is then fed past single gap magnetic head 1 which generates an analog electrical signal corresponding to the time derivative of the change in flux of the magnetized ink.

Due to the fact that different characters scanned may be printed in magnetic ink of different density, the electrical signals outputted by magnetic head 1 for different characters may vary over a relatively wide dynamic range. To handle this dynamic range variable gain amplifier 2, follow and hold network 4 and difference detector 3 form a keyed AGC loop which normalizes the magnitude of each of the character waveforms inputted thereto. The AGC loop operates by controlling the gain of variable gain amplifier 2 in accordance with the magnitude of the first peak of the waveform.

The peak occurrence detector 6, which is fed with the output signal from the magnetic head at input 10 is a network which detects the time of occurrence of each peak of the waveform. An output signal corresponding to the time of occurrence of each peak is generated at output 13. An output signal corresponding to the time of occurrence of the first peak of the waveform is generated at output 11 and held there until an end of character reset signal occurs at input 12. Network 6 may, for instance, include a zero slope detecting circuit which switches in the manner of a flip flop on alternate zero slope points of the signal. The circuit would be connected to a pulse generator which would generate a pulse each time the circuit switches and the output signals of which would be present at output 13. The circuit would also be connected to a bistable network which would be set at output 11 by the first peak and which would not be reset until the occurrence of a signal at input 12. One shot delay network 7 would be adjusted to delay the signal at output 11 for the duration of one character scan at which time the signal would reset the bistable unit at input 12.

The signal from variable gain amplifier 2 is directed to follow and hold module 4 which may be a commercial follow and hold module. The function of follow and hold module 4 is to track the analog signal from the amplifier 2 and to retain the voltage of the maximum excursion of the first pulse of the waveform. The follow and hold module is operative to follow its input until a signal from peak occurrence detector 6 occurs at input 8 whereupon follow and hold module 4 is operative to retain the voltage it has reached at that time. The DC voltage output of follow and hold module 4 representing the maximum amplitude of the first peak of the analog waveform is compared in difference detector 3 with a constant DC voltage which is present at input 9 and an error voltage is generated and fed to variable gain amplifier 2 at gain control input 27 for controlling the gain of the amplifier. Follow and hold module 4 is reset at the end of each character by the disappearance of the signal at input 8. Thus, the gain of amplifier 2 is established by the magnitude of the first excursion of the analog waveform and is held constant throughout the passage of each character by the magnetic head.

The output of variable gain amplifier 2 is also fed to follow and hold module 5, which may be a commercial follow and hold module. Follow and hold module 5 is operative to follow its analog input signal unti it receives a signal at input 15 from peak occurrence detector 6 indicating that a peak of the waveform has occurred. At this time, follow and hold module 5 will retain the voltage it has reached and feed this voltage to A to D converter 17 which is triggered to convert by a signal on line 76. A to D converter 17 may be a conventional commercial analog to digital converter module which converts the magnitude of its input signal to a 9 bit binary code as represented by lines 18. A to D converter 17 additionally has a line 19 on which a signal indicative of the sign of the input signal is generated and a status line 20 indicating that the A to D conversion has been completed. A status signal generated on line 20 is fed to input 16 of follow and hold module 5 to reset the follow and hold module and to allow it to begin to follow the next excursion of the waveform. Follow and hold module 5 thus retains the peak voltage for the length of time it takes A to D converter 17 to make the conversion and stabilize.

Figure 3:
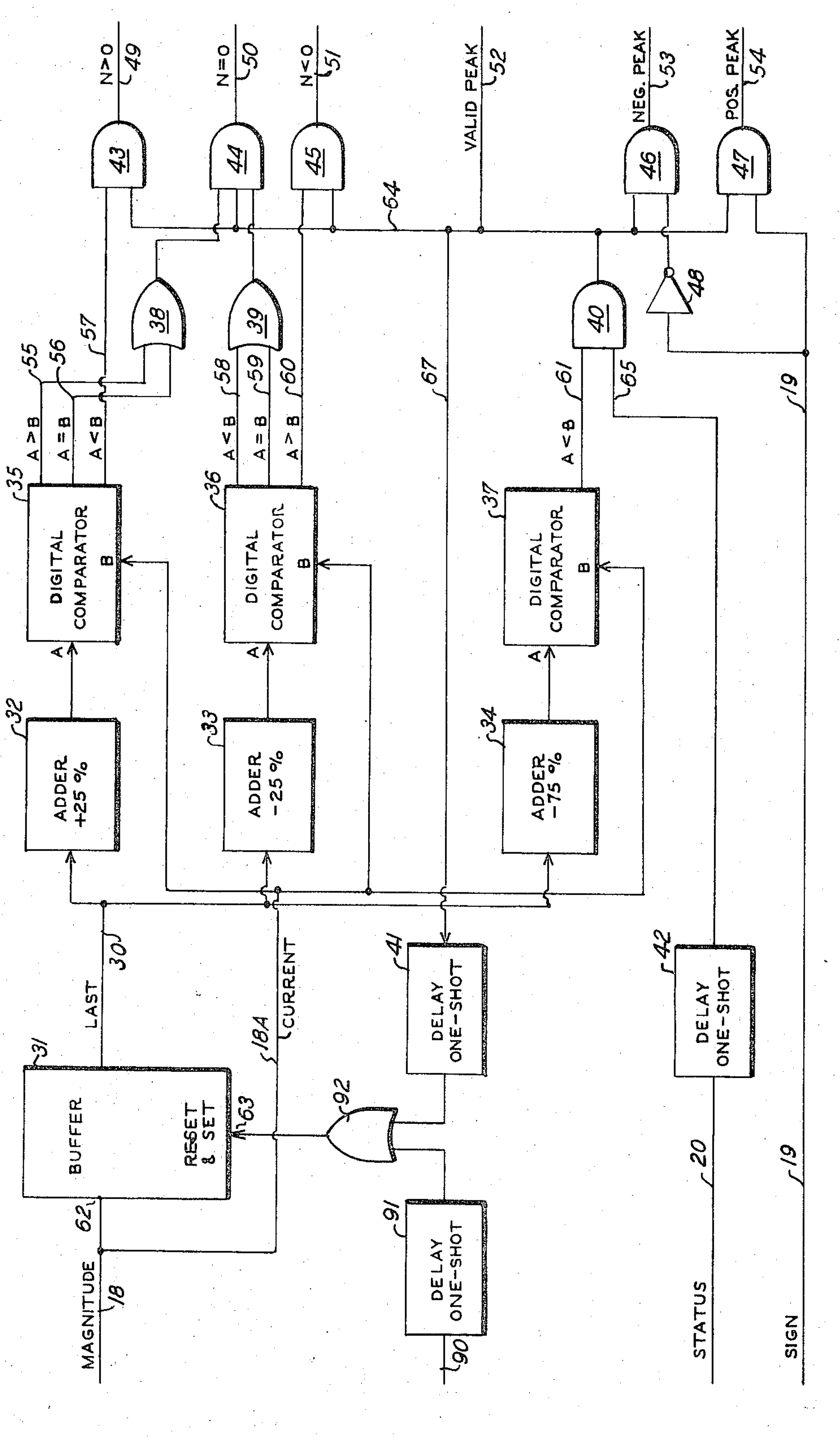
FIG. 3 represents a block diagram of the digital comparison network shown in FIG. 2.

The coded digital signals for adjacent peaks are fed to digital comparison network 21, shown in greater detail in FIG. 3, which provides output signals on lines 22 indicative of whether a signal fed to the network, known as the new signal, is a certain percentage greater than, or less than, or equal to the previous signal fed to the network, known as the old signal. Additionally, digital comparison network 21 provides an output indicative of whether or not the new peak is a valid peak at all, or whether it is a spurious signal or noise and therefore not a valid peak. Additionally, network 21 has negative and positive output lines which indicate whether the new signal is negative or positive.

When an E13B character is scanned by a single gap magnetic head, the peaks of the waveform should occur only at eight discrete times. The initial peak of the waveform is operative to trigger timing network 14 to produce seven equidistant timing pulses corresponding to the time of occurrence of the seven next possible peak positions of the waveform. Timing network 14 may be a standard timing network as known to those skilled in the art such as, for instance, a timing network employing a clock and counter. Timing network 14 should be adjusted so that the timing pulses arrive at input 28 of feature recognition network 23 at the same time as signals are outputted on lines 22. The timing signals on line 28 will therefore take into account the propagation time of the magnitude signals through the system and will actually occur slightly after the occurrence of the peaks of the waveform.

Thus, both the comparison signals from digital comparison network 21 on lines 22 and timing signals on line 28 are fed into feature code generator 23. A feature is defined as a unique combination of (1) An $N>0$ signal; an $N<0$ signal or an $N=0$ signal, (2) A negative or positive signal and, (3) One of the seven possible timing signals. Feature code generator 23 generates a unique digital code for each feature. For instance, in the system illustrated a six bit digital code may be used with two bits used for the amplitude comparison signals, one bit used for polarity and three bits used for the time signal. The feature code generator is arranged not to produce an output signal unless a signal is also present on valid line 22 indicating that the current peak is a valid peak.

Digitally coded feature signals for each of the time frames two to seven are fed to character recognition network 25 which comprises logic circuitry arranged as known to those skilled in the art to produce an output on a different one of output lines 26 for each unique combination of feature inputs occurring over the duration of a character scan. For instance, according to one arrangement each different code on lines 24 would provide a signal on a different wire and the wires would be selectively connected to a plurality of AND gates, there being one AND gate for each character. When all of the features for a given character are present all of the selected wires connected to the AND gate corresponding to that character would be high and the AND gate would generate an output signal on one of lines 26. Network 25 is thus arranged to store each set of feature signals occurring on lines 24 for the duration of a character scan and to make the recognition decision on the basis of all of the feature input signals occurring during the scan of a character. At the end of the character duration a signal appears at input 29 to read out and then reset the network to allow it to begin to accumulate features for the next character. Each output line 26 is indicative of a different character and because there are 14 characters in the E13B font 14 output lines 26 are shown in FIG. 2. Network 25 is further arranged to emit a reject signal on line 77 if none of the recognition criteria defined by it for any of the characters is met. Output lines 26 are fed to a utilization device such as a tape storage system or a document sorter. An improved recognition system is disclosed in copending application 315,766 filed Dec. 15, 1972 and assigned to the same assignee as the present application.

FIG. 3 shows the digital comparison network shown in FIG. 2 in greater detail. According to the definitions of a preferred embodiment of the invention if a new pulse is within 25 percent greater or smaller than an old pulse (the previous pulse), it is defined as being equal to the old pulse and an N = 0 output will appear on line 50 in FIG. 3. If a new pulse is more than 25 percent greater than an old pulse then according to the system definitions new is greater than old and a signal will appear on N>0 line 49. On the other hand, if a new pulse is more than 25 percent less than an old pulse new is defined as less than old and a signal is generated on N<0 line 51. In order to effect the system definitions, as is described in greater detail below, 25 percent of the old pulse is both added and subtracted from the new or current pulse in adders 32 and 33.

Digital comparison network 21 has four inputs fed thereto from A to D converter 17, a status input indicating that A to D converter 17 has finished the analog to digital conversion, a sign line input, the presence of a signal thereon indicating that the current peak is positive and the absence of a signal thereon indicating that the current peak is negative, peak magnitude input lines 18 which are selectively activated to result in a nine bit digital code representative of the magnitude of the peak being fed in, and input line 90, a signal on which is indicative of the occurrence of the first peak. For clarity of illustration the nine line input, as well as the lines feeding to digital comparators 35, 36, and 37 are represented in FIG. 3 as a single line.

The nine bit digital signal representative of the magnitude of peak A of the waveform shown in FIG. 1 is fed into buffer 31 at input 62. Buffer 31 may be a 1 × 9 bistable latch and the output of the latch appears at line 30 which once again is actually nine lines which has been represented as a single line for clarity of illustration. To ensure that buffer 31 is re-set at the time that the digital signal representative of peak A is fed thereto a signal indicative of the occurrence of peak A on line 90 is delayed by one-shot multivibrator 91 to allow for the propagation time of the signal ultimately appearing at line 18 through the components of the system and is fed to OR gate 92 which passes the signal to buffer 31 to place it in the re-set state. The signal on line 30 is fed to adders 32, 33 and 34, adders 32 and 33 being operative to generate outputs which are, respectively, 25 percent greater and 25 percent less than the inputs thereto. The signals at inputs A of digital comparators 35 and 36 are thus, respectively, representative of the magnitude of peak A plus 25 percent of peak A and the magnitude of peak A minus 25 percent of peak A.

The nine bit digital signal representative of the magnitude of peak B is next outputted from A to D converter 17 on line 18. The buffer is filled with the bits of peak A and the new signal on line 18 does not affect the signals in the buffer and signals representative of the magnitude of peak B are thus fed to line 18A and from there to inputs B of digital comparators 35, 36 and 37. Digital comparator 35 is operative to provide an output on line 55 if the signal at input A is greater than the signal at input B, an output on line 56 if the signal at input A is equal to the signal at input B and a signal on line 57 if the signal at input A is less than the signal at input B. In a similar manner digital comparator 36 is operative to provide outputs on lines 58, 59 and 60. An output on line 57 thus indicates that input A is less than input B or that the old pulse or in the case of FIG. 1 pulse A plus 25 percent of pulse A is less than the new pulse or pulse B. This signal is fed to AND gate 43 which will produce a signal on line 49 when enabled by a signal on line 64 indicating that the new peak is more than 25 percent greater than the old peak or in terms of the system definitions that new is greater than old or N>0.

A signal on output line 60 of digital comparator 36 indicates that input A is greater than input B or that the new peak is less than the old peak minus 25 percent of the old peak. When an output appears on line 64 AND gate 45 produces an output on line 51 indicating in terms of the system definitions that new is less than old or N<0.

In a similar manner if the new peak is exactly 25 percent greater than the old peak an output will appear on line 56 of comparator 35 as well as on line 58 of comparator 36 whereas if the new peak is exactly 25 percent less than the old peak an output will appear on line 59 of comparator 36 and line 55 of comparator 35. If the new peak is within 25 percent or smaller than the old peak, then outputs will appear on both line 55 of comparator 35 and line 58 of comparator 36. Thus, both OR gates 38 and 39 will generate outputs if the new peak is exactly 25 percent greater or smaller or within 25 percent greater or smaller than the old peak. The outputs of OR gates 38 and 39 are fed to AND gate 44 which generates an output on line 50 when enabled with a signal on line 64, indicating that the new pulse is within 25 percent of the old pulse or according to the system definitions, new equals old or N = 0.

The presence of a signal on sign line 19 indicates that a positive peak was inputted to A to D converter 17 whereas the absence of a signal on line 19 indicates that a negative signal was inputted to A to D converter 17. Line 19 is fed to AND gate 47 which when activated with a signal from line 64 is operative to provide an output on line 59 indicating that the new peak is a positive peak. Line 19 is also fed to inverter 48 which provides a signal to the input of AND gate 46 when no signal is present on line 19, AND gate 46 being operative to provide an output signal on line 53 indicating that the new peak is a negative peak when activated by a signal from line 64.

None of the AND gates 43 to 47 can produce an output signal until a valid peak signal appears on line 64, so that spurious pulses and noise are not mistaken for peaks, a valid peak being defined by the system as being at least 25 percent of the previous peak. 75 percent of the old pulse is subtracted from the magnitude of the old pulse in adder 34 and is fed to input A of digital comparator 37. The new pulse is fed to input B of digital comparator 37, and an output appears on line 61 when input B is greater than input A or when the new peak is at least 25 percent of the old peak.

An input to digital comparison network 21 will be generated on status line 20 when A to D converter 17 has finished the A to D conversion process. The status signal 20 is fed to delay one-shot multi-vibrator 42 which is adjusted to provide a delay equal to the propagation time of the digital magnitude signals through the adder-digital comparator part of the system so that at the time that the status signal appears in input 65 of AND gate 40 the signal on line 61 is present. If the new pulse is at least 25% of the old pulse AND gate 40 will produce an enable output pulse on line 64 and a valid peak signal on line 52.

The signal on line 64 is delayed by delay one shot multivibrator 41 for a period of time which is long enough to insure that processing of the two peaks is completed but short enough so that a re-set signal appears at input 63 of buffer 31 through OR gate 92 before the new pulse disappears from line 18. Buffer 31 becomes re-set by the signal at input 63 and the magnitude signal representative of the new peak of the two peaks just compared is inputted and stored by the buffer 31 and becomes the old peak of the next comparison. The magnitude signal representative of the next new peak arrives at line 18 and in the manner just described is compared with the magnitude signal inputted to buffer 31. In this manner, adjacent peaks of the entire wavefore are compared, the new peak of one comparison becoming the old peak of the next comparison.

Further, while we have described and illustrated a preferred embodiment of our invention, we wish it to be understood that we do not intend to be restricted solely thereto, but that we do intend to cover all modifications thereof which would be apparent to one skilled in the art and which come within the spirit and scope of our invention.

We claim:

1. In a character reading system wherein an analog voltage having a waveform unique to each character to be read is generated, said unique waveform including a permutated sequence of varying peak amplitudes and times of occurrence of same corresponding to the shape of the character being read, means for analyzing said waveform by comparing signals corresponding to the amplitudes of adjacent peaks to each other and for deriving feature signals in binary form from said analysis, and means responsive to said feature signals for deriving further binary electrical signals corresponding to the character recognized, the improvement comprising, means for detecting each analog peak amplitude analog to digital conversion means for converting each detected peak amplitude to a permutated binary number representative thereof means for storing each said binary number means for comparing each stored binary number with the next succeeding binary number corresponding to the next peak in said sequence to determine if said next peak is larger, smaller, or of the same size as the peak preceding it means for storing a signal indicative of each of said comparisons until the occurrence of the end of said analog waveform, said stored signals constituting said feature signals.

2. The character reading system of claim 1 further including means for generating timing signals responsive to the occurrence of the initial peak of the waveform.

3. The character reading system of claim 2 wherein said means for storing said signals indicative of said comparisons includes an input for said timing signals and wherein said signals indicative of said comparisons are also indicative of the time of occurrence of said peaks being compared.

4. The character reading system of claim 3 wherein said means for comparing includes means for adding and subtracting to each stored binary number a fixed percentage of that binary number before the binary number is compared to the binary number corresponding to the next succeeding peak.

5. The character reading system of claim 2 wherein said analog to digital conversion means determines the polarity of each detected peak.

6. The character reading system of claim 2 further including means for normalizing the analog voltage representative of each character.

7. The character reading system of claim 6 wherein said means for normalizing comprises an AGC loop which is keyed to the amplitude of the initial peak of the waveform.

8. The character reading system of claim 7 wherein said AGC loop includes a variable gain amplifier, and a follow and hold network arranged to hold the amplitude of said initial peak, a signal derived from the output of said follow and hold network being fed to said amplifier to control its gain.

9. The character reading system of claim 2 wherein said means for detecting each analog peak amplitude comprises a follow and hold network.

10. A method for recognizing a unique analog waveform which is one of a plurality of possible analog waveforms belonging to a set of unique analog waveforms comprising the steps of detecting each analog peak amplitude of said waveform converting each detected peak amplitude to a permutated binary number representative thereof storing each said binary number comparing each stored binary number with the next suceeding binary number corresponding to the next peak of said waveform to determine if said next peak is larger, smaller, or of the same size as the peak preceding it, storing the results of each said comparison deriving from said stored results a different signal for each of said unique waveforms.

* * * * *